United States Patent [19]
Moran et al.

[11] Patent Number: 6,132,590
[45] Date of Patent: Oct. 17, 2000

[54] ELECTROLYTIC PROCESS FOR TREATING AQUEOUS WASTE STREAMS

[75] Inventors: Stephen W. Moran; John R. Jackson, both of Wilmington, N.C.

[73] Assignee: Huron Tech Corp, Delco, N.C.

[21] Appl. No.: 09/088,195

[22] Filed: Jun. 1, 1998

Related U.S. Application Data

[60] Provisional application No. 60/071,088, Jan. 9, 1998.

[51] Int. Cl.$^7$ ...................................................... C25B 1/00
[52] U.S. Cl. ........................ 205/496; 205/756; 205/752; 205/762; 205/746; 204/168
[58] Field of Search .................................. 204/415, 232, 204/257, 268, 347, 373, 383, 510, 511, 508

[56] References Cited

U.S. PATENT DOCUMENTS

| | | | |
|---|---|---|---|
| 2,140,194 | 12/1938 | Yabroff | 204/9 |
| 2,317,600 | 4/1943 | Benedict | 204/136 |
| 2,654,706 | 10/1953 | Gaylor | 204/153 |
| 2,859,177 | 11/1958 | Rippie et al. | 208/235 |
| 3,401,101 | 9/1968 | Keller | 204/136 |
| 3,926,754 | 12/1975 | Lee | 204/152 |
| 4,038,366 | 7/1977 | Fukuda et al. | 423/234 |
| 4,101,394 | 7/1978 | Johnson | 204/77 |
| 4,191,620 | 3/1980 | Young et al. | 204/149 |
| 4,246,079 | 1/1981 | Goodrich et al. | 204/98 |
| 4,253,923 | 3/1981 | Lynch | 204/98 |
| 4,519,881 | 5/1985 | Chang | 204/149 |
| 4,613,416 | 9/1986 | Kau | 204/98 |
| 4,772,366 | 9/1988 | Winnick | 204/128 |
| 5,019,227 | 5/1991 | White et al. | 204/128 |
| 5,098,532 | 3/1992 | Thompson | 204/98 |
| 5,391,267 | 2/1995 | Zoppi | 204/98 |
| 5,575,901 | 11/1996 | Hulme | 205/413 |

*Primary Examiner*—Kathryn Gorgos
*Assistant Examiner*—J. Maisano
*Attorney, Agent, or Firm*—Andrew E. Pierce

[57] ABSTRACT

An electrochemical process for the production of a hydroxide solution and a sulfate by the electrolysis of a waste aqueous mixture of oxidizable sulfur impurities in the anode compartment of at least one electrolytic cell while producing a hydroxide solution in the cathode compartment of the cell. The process is particularly applicable to the treatment of spent caustic solutions obtained by scrubbing a hydrocarbon process stream contaminated with oxidizable sulfur impurities. The electrolytic cell used in the electrolysis process of the invention can use either a porous membrane or a cationic permselective membrane to separate the anode and cathode compartments of the electrolysis cell. The electrolysis cell can be monopolar or bipolar and when bipolar, the bipolar electrodes if dissimilar, or the respective anode and cathode current collectors if dissimilar, which are attached thereto, are electrically connected by bonding with a conductive polymer or are joined by welding with or without an intermediate metal layer therebetween. Control of pH in the anolyte compartment of the electrolytic cell can be achieved by passing a selected amount of catholyte to the anolyte compartment. Pre-treatment with oxygen produced in the anolyte compartment of the cell avoids release of gaseous products from the anolyte compartment and increases process efficiency. Where the process is conducted in multiple electrolytic cells, such cells are hydraulically connected in a cascading series.

10 Claims, 1 Drawing Sheet

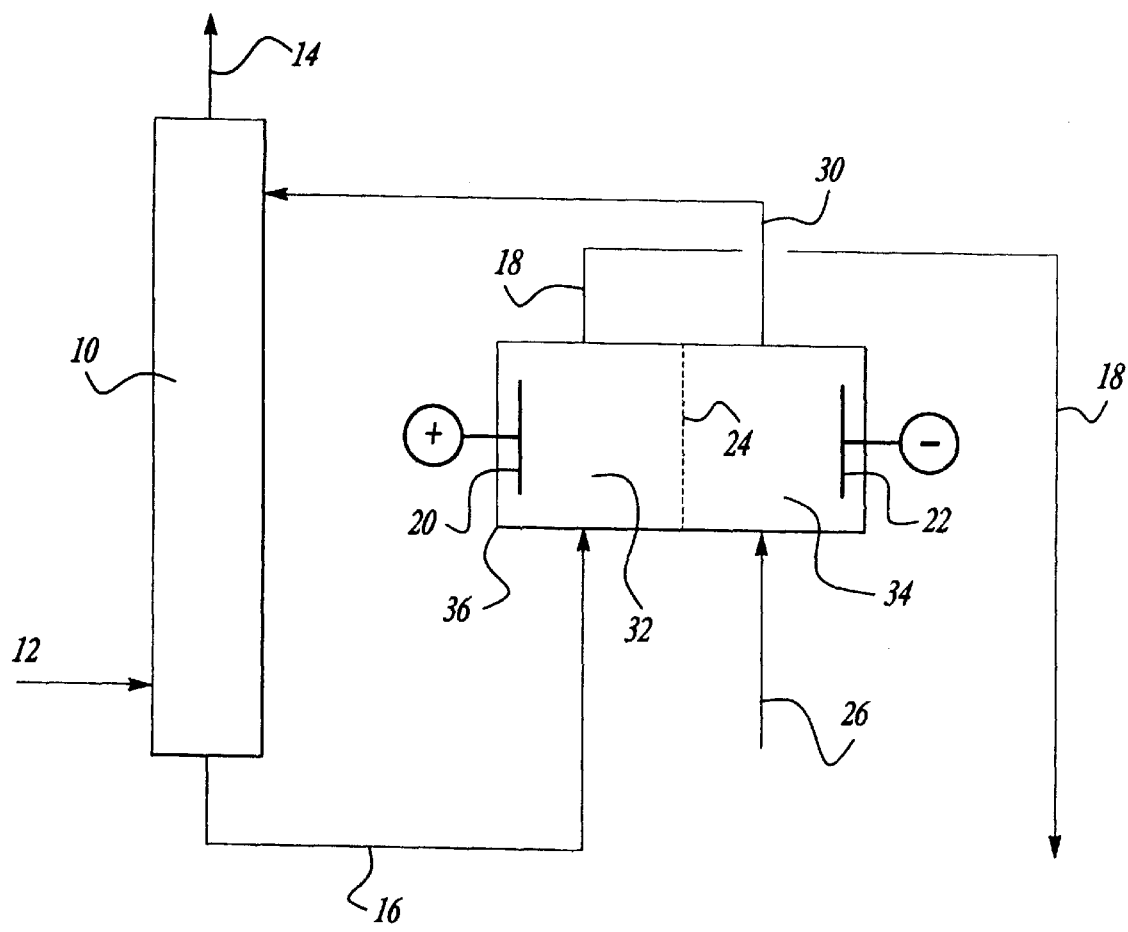
*Figure*

ELECTROLYTIC PROCESS FOR TREATING AQUEOUS WASTE STREAMS

The priority date of U.S. Ser. No. 60/071,088 filed Jan. 9, 1998 is claimed.

TECHNICAL FIELD

This invention is directed to an electrochemical process for producing a hydroxide solution and a sulfate solution by an electrochemical process from an aqueous, alkaline waste stream utilized to scrub a hydrocarbon liquid or gas.

BACKGROUND ART

Various industrial processes utilize an aqueous solution of sodium hydroxide to wash reaction products or to remove undesirable compounds as a means of purifying desired reaction products. For instance, caustic is used to wash petroleum products in order to remove undesirable compounds from a feed stock prior to polymerization of propene and butene to obtain high octane gasoline blending components. Such polymerization reactions typically take place under high pressure in the presence of a phosphoric acid catalyst and the hydrocarbon feed stock must be free of sulfur which poisons the catalyst or basic materials which neutralize the catalyst and oxygen which deleteriously affects the polymerization reaction. Accordingly, the propene and butene feed stock is washed first with caustic to remove mercaptans and subsequently with an amine solution to remove hydrogen sulfide. Subsequently, the feed stock is washed with water to remove the caustic and amine reaction product. Accordingly, the waste water stream will contain caustic, amines, and mercaptans.

In petroleum refining, chemical treatment is used to remove or change the undesirable properties associated with sulfur, nitrogen or oxygen compound contaminants in petroleum feed stocks. The chemical treatment process involves extraction or oxidation (also known as sweetening). A typical extraction process is "Merox" extraction. This process is used to remove mercaptans from propane/propylene and butane/butylene feed streams. These streams may also undergo treatment with an amine before Merox extraction to remove excess hydrogen sulfide which tends to fractionate with propane/propylene and interferes with the Merox process. A caustic prewash removes any remaining trace hydrogen sulfide prior to Merox extractions. These streams are passed up through trays of an extraction tower. A caustic solution flowing down the extraction tower absorbs mercaptan. The rich caustic is then regenerated by oxidizing the mercaptans to disulfide in the presence of aqueous Merox catalyst and the lean caustic recirculated to the extraction tower. The disulfide is insoluble in the caustic and can be separated.

Oxidation or "sweetening" is used in the purification of gasoline and distillate fractions. A common oxidation process is also a Merox process that uses a solid catalyst bed. Air and a minimum amount of alkaline caustic is injected into the hydrocarbon stream. As the hydrocarbon passes through the Merox catalyst bed, sulfur mercaptans are oxided to disulfide. The disulfide can remain with the gasoline product, since it does not possess the objectionable odor properties of mercaptans. Caustic solutions can also be used to absorb and remove hydrogen sulfide and phenol contaminants from intermediate and final product streams during the refining of petroleum. Aqueous caustic waste streams containing phenols can be recycled by reducing the pH of the aqueous caustic until the phenols become insoluble thereby allowing physical separation.

Caustic soda and soda ash have been used as an alkalinity source in the liquid scrubbing of sulfur dioxide present in gases produced from crude oil-fired steam generators. The use of caustic allows the sulfur dioxide scrubber to run at a lower pH with a higher sulfur dioxide removal capacity in comparison with the use of soda ash. Such processes result in a large amount of waste caustic solution which, heretofore, has been disposed of by sewering.

As is known, many intermediate and final streams from plants for the processing of petroleum products contain a variety of acid compounds such as hydrogen sulfide, mercaptans, phenols, thiophenols and naphthenic acids. These substances must be removed or reduced in concentration and the compounds containing sulfur must be reduced to low enough concentrations to reduce odor. Aqueous solutions of sodium hydroxide are usually used in concentrations of between five and fifteen percent by weight to treat petroleum products so as to accomplish the desired reduction in concentration of the undesired components. Spent caustic soda solutions will have different compositions depending upon whether the caustic solution has been used for purification of propane and butane gases or in the purification of petroleum feed stocks obtained from thermal and/or catalytic "cracking" or of "straight-run" hydrocarbons which are obtained by distillation of crude oil at atmospheric pressure. However, in general, the spent caustic soda solutions have pH values ranging from 12.5 to 13.5 and the following compositions expressed in percent by weight: Free caustic soda 5.0–7.5; total oils 0.5–2.0; total sulfides 0.1–3.0; cyanides 0.05–0.3; ammonia 0.05–0.4; phenols 0.2–10; lead $2.10^{-4}$–$10.10^{-4}$; arsenic $1.10^{-4}$–$5.10^{-4}$; copper $5.10^{-4}$–$50.10^{-4}$; cadmium $1.10^{-4}$–$5.10^{-4}$; and the balance being water.

In U.S. Pat. Nos. 5,589,053 and 5,667,668, an electrolysis process for removal of caustic in hemicellulose caustic is disclosed. The caustic is recovered by electrolysis in an electrolytic cell utilizing as an electrolyte a mixture of hemicellulose and caustic which is essentially free of lignin. By electrolysis, the concentration of caustic in the anolyte compartment of the cell is decreased and the concentration of caustic in the catholyte compartment of the cell is increased so as to allow recovery of about 60 to about 80% of the caustic contained in the hemicellulose caustic starting solution.

Mercaptans have been removed in the prior art from caustic scrubber solutions by blending the caustic with oxidation agents, such as tannic acid, and then blowing air through the spent caustic scrubber solutions to oxidize the mercaptans to disulfides. The disulfides are then either skimmed off as an oily layer or further oxidized to thiosulfate or sulfate using other techniques. The prior art spent caustic scrubber solutions are then either neutralized and sewered or the oxidized sulfur compounds are precipitated with precipitating agents, such as iron, and the precipitate which is formed is removed by filtration leaving the caustic solution filtrate clean enough to be returned to the scrubber. Because of the cost of the precipitation option, current prior art practice mostly employs the neutralization and sewering option. This requires large amounts of sulfuric acid which greatly increases the amount of sulfate effluent waste which is discharged from the refinery.

Regeneration of a spent caustic solution comprising oxidizing the spent caustic stream with an air/ozone gas mixture, followed by ultraviolet radiation of the oxidized spent caustic stream, is disclosed in U.S. Pat. No. 5,268,104. The treatment of spent aqueous solutions of caustic soda utilizing a combination of ozone and calcium hypochlorite is disclosed in European Patent Application 509964A1. In these references, the spent aqueous caustic solution is obtained subsequent to the scrubbing of flue gases generated, respectively, in the production of ethylene or petroleum product processing streams containing compounds such as hydrogen sulfide, mercaptans, phenols, thiophenols, and naphthenic acids.

Gaylor, U.S. Pat. No. 2,654,706, regeneration of a spent caustic solution used to scrub sour gasoline to remove oxidizable sulfur compounds such as mercaptans, hydrogen sulfides, etc. is disclosed in which the spent caustic solution is electrolyzed in a filter press electrolysis cell having a diaphragm and insoluble electrodes. Following electrolysis, the disulfides produced are separated prior to passing the regenerated caustic back to the scrubbing process. The examples in Gaylor show the use of electrolytic cell current densities of generally less than 0.2 amps per square inch and cell voltages of about 6 volts or the minimum current density required to oxidize the sulfur containing impurities in the spent caustic solution. Just enough oxygen is generated by electrolysis of the spent caustic solution to oxidize all of the mercaptans present to disulfides. The disulfides are physically separated outside the electrolysis cell in a separation vessel. It is apparent that the process of Gaylor is intended to replace the prior art use of oxidation agents, such as tannic acid, and blowing air into the spent caustic solution to oxidize the mercaptans to disulfides. The Gaylor process would be a more expensive process than the air oxidation step of the prior art but, more importantly, the Gaylor process omits mention of the fact that during electrolysis, some of the sulfur compounds will be oxidized to thiosulfates or sulfate. These oxidized sulfur compounds will eventually build up in the spent caustic electrolyte to the saturation point so as to require either a sulfate removal step or removal by the use of vacuum crystallization or the neutralizing of the spent caustic solution followed by disposal to the environment of the oxidized spent caustic solution. As indicated above, in the Gaylor process the disulfides produced during electrolysis of the spent caustic solution are removed to the environment without further oxidation. Under present or contemplated governmental restrictions, disposal of these disulfides may represent an environmental liability, thus requiring destruction prior to discharge to the environment.

In Rippie et al, U.S. Pat. No. 2,859,177, a spent caustic solution used in the scrubbing of sour gasoline, in order to remove oxidizable sulfur compounds, is regenerated by reaction, outside an electrolysis cell with oxygen generated by electrolysis. The regenerated caustic solution subsequent to regeneration is passed to a disulfide scrubber prior to recycling the regenerated caustic back to the scrubbing stage of the process. As in Gaylor, Rippie et al discharges disulfides to the environment or recovers the disulfides for sale. Currently, disulfides have little or no chemical value and, accordingly, would be required to be discharged to the environment subsequent to recovery after scrubbing in the process of Rippie et al. In addition, the build-up of oxidized thiosulfate or sulfate compounds in the regenerated caustic solution would require, as in the case of Gaylor, either a sulfate removal step, such as vacuum crystallization, or chemically neutralizing the regenerated caustic solution prior to disposal to the environment.

In one embodiment of the process of the present invention by the use of an electrolysis cell operating at about 5 to about 10 times the current density and at about half the voltage utilized by Gaylor, a caustic can be regenerated and mercaptans and disulfides can be converted to elemental sulfur, which can be recovered for chemical value by filtration, and/or an aqueous solution comprising sulfates, which are water soluble and can be disposed of without liability to the environment. In the electrochemical cell utilized in the process of the invention, excess oxygen is liberated in the anode compartment of the cell which results in the conversion of mercaptans, disulfides, and sulfides present as impurities in the spent caustic solution to elemental sulfur and/or sulfates. Rather than vent the excess oxygen to the environment during processing, the excess oxygen can be passed to a column for pre-treatment of the feed spent caustic solution. The use of a cationic permselective membrane as a cell separator in the electrolysis cell utilized in the process of the invention allows the formation in the cathode compartment of the cell of a pure sodium hydroxide upon the feeding of deionized water to the cathode compartment. A porous membrane cell separator can be used where recovery of a pure sodium hydroxide solution is not required. Accordingly, by use of the process of the invention, it is possible to reduce the purchase of caustic in an amount equivalent to the amount of the sulfur compounds scrubbed from the hydrocarbon process streams and discharged as sulfates. The process of the invention is applicable in one embodiment to destroy or convert to a benign, environmentally non-toxic state the sulfur containing compounds or other organic ingredients removed by caustic scrubbing of a hydrocarbon process stream such as those streams from olefin plant, ethane and propane crackers as well as sour gasoline process streams.

SUMMARY OF THE INVENTION

A process for electrochemically regenerating an aqueous ammonium, alkali, or alkaline earth metal hydroxide compound, preferably a spent caustic solution, utilized to remove sulfur containing impurities from hydrocarbon process streams by the use of an electrolytic cell, preferably, having a cationic permselective membrane operating at high current efficiency and low voltage. The sulfur impurities therein are electrochemically and chemically oxidized either to elemental sulfur or water soluble sulfates. Elemental sulfur can be recovered, if desired, for its chemical value by filtration from the spent caustic solution but need not be recovered in which case it is oxidized to sulfate. The soluble sulfates can be disposed of without harm to the environment. In contrast to the prior art methods of treating spent caustic solutions, in the process of the invention, the build up of thiosulfate or sulfate compounds in the regenerated caustic solution of the prior art is avoided and the disulfides produced during electrolysis rather than being removed are oxidized to soluble sulfates.

The electrochemical cell which is used is operated at a current density so as to liberate excess oxygen. Generally, the electrochemical cell is operated at a current density of about 1 to about 3 amps per square inch, preferably, about 1.5 to about 2.5 amps per square inch, and, most preferably, about 1.5 to about 2.0 amps per square inch. In the process of the invention, in addition to recovery of caustic and elemental sulfur, if desired, from the spent caustic solution, the disulfides produced during electrolysis are electrochemically oxidized to environmentally acceptable, neutral sulfates without the addition of acids. The preferred electrochemical cell for use in the process of the invention is disclosed in commonly assigned, co-pending application, Ser. No. 08/552,938, filed Nov. 3, 1995, incorporated herein by reference.

DISCLOSURE OF THE INVENTION

A process is disclosed for the oxidation of reduced sulfur containing compounds and for the removal of caustic from waste streams, generated in the refining of petroleum, olefin production, gas fractionation, such as waste streams resulting from steam-cracking operations, and waste streams from the liquid scrubbing of sulfur dioxide flue gas. Generally, spent caustic aqueous solutions are formed when petrochemicals or refined hydrocarbons are treated with caustic soda solutions in order to remove flue gases such as hydrogen sulfide and carbon dioxide and impurities such as phenols, carboxylic acids, aldehydes, and mercaptans. Such waste streams can be treated for recovery of a portion of the caustic in such waste streams and spent caustic steams by treatment in an electrolytic cell such as an electrolytic cell of the filter press type using either a monopolar or bipolar electrode configuration.

The frames of the preferred electrolytic cell, which is disclosed in co-pending, commonly assigned application, Ser. No. 08/552,938, can be molded from any thermoplastic polymer, preferably PVC. Alternatively, the cell frames can be formed by laminating polymer sheets using a polymer adhesive. Both thermoplastic and thermosetting polymer sheets can be used. The anode and cathode of the cell can be separated by any suitable ion exchange membrane or porous membrane cell separator. The preferred bipolar electrodes can be electrically connected, in one embodiment, where anode and cathodes are of dissimilar metals by welding or gluing with an electrically conductive adhesive. Preferably, a ductile polyester resin mixed with graphite or metal particles is used to connect the bipolar electrodes. The preferred polyester resin is a vinyl ester having an elastomer monomer grafted onto the vinyl ester polymer backbone. The anode and cathode can be any stainless steel, mild steel, nickel, nickel coated steel, nickel/aluminum coated steel, nickel/zinc coated steel, graphite or other forms of carbon, Hastelloys, titanium oxides, titanium, niobium, or tantalum, dimensionally stable anodes, mixed ruthenium/titanium oxides on titanium, iridium oxide on titanium, platinum, platinum/titanium, platinum/iridium on titanium, etc., and, conducting ceramics. Both anode and cathode can be separated by stand-off posts in electrical contact with the individual current collectors. The electrolytic cell frames can be formed of any suitable polymer, preferably, polyvinyl chloride. Suitable thermoplastic polymers can be injection molded, but, preferably, are formed by lamination of sheets of the desired polymer with any suitable adhesive. Preferably, the sheets are bonded with the same ductile polyester resin, as described above.

In one embodiment of the process of the invention, an aqueous spent caustic stream is led to the anolyte compartment of an electrolytic cell which is operated at a temperature, generally, of about 20° C. to about 100° C., preferably, about 25° C. to about 75° C., and most preferably, about 40° C. to about 60° C. Deionized water is fed to the catholyte compartment of the cell. By the process of invention, a caustic solution can be withdrawn from the catholyte compartment of said cell at a considerably higher concentration than existed in the aqueous caustic waste stream.

The spent aqueous caustic solutions treated in the process of the invention are, for instance, the waste streams formed when thermal and catalytically cracked petroleum distillates and refined hydrocarbons are treated with sodium hydroxide solutions in order to remove gases such as carbon dioxide and hydrogen sulfide and impurities such as, hydrocyanic acids, phenols, carboxylic acids, aldehydes, and mercaptans. Generally, the electrolytic cell described above is used so as to remove a portion of the caustic from the waste stream so as to recover usable caustic, reduce the cost of neutralization of such waste streams using mineral acids, for example, sulfuric acid and hydrochloric acid or neutralization using gases containing carbon dioxide and sulfur dioxide. In addition to reducing the cost of neutralization of the waste stream, disposal costs are reduced and toxic chemicals contained as components of the aqueous caustic waste stream can be converted into inert salts. The mercaptans and sulfides and other reduced sulfur containing compounds, present as contaminants in the waste caustic stream, will readily oxidize at the anode surface of the electrolytic cell to yield sulfate or thiosulfate salts.

The process can be conducted in a single electrolytic cell or in a cascading series of cells. Each cell in the series is hydraulically connected in parallel or series to a succeeding cell so as to allow partial oxidation of the reduced sulfur compound contaminants in each cell of the series. A cascading series of electrolytic cells connected in series allows more economical selection of electrodes. Where a single cell or multiple cells are used, the excess oxygen produced in the anode compartment of the cell or cells can be fed to a pre-treatment column in order to effect partial oxidation therein of incoming spent caustic solution prior to conducting electrolysis.

Given the above prior art processes of neutralizing aqueous caustic waste streams, there is a need for a process which makes it possible to not only reduce the cost of neutralization of the aqueous caustic waste stream but reduce disposal costs involved as the result of the presence of toxic chemicals in the aqueous waste caustic streams.

The process of the invention utilizing an electrolytic cell to recover a portion of the sodium hydroxide present in the aqueous waste caustic stream as well as to convert the toxic chemicals into inert salts can be accomplished by operation of the electrolytic cell, generally, at a temperature of about 20° C. to about 100° C. a current density, generally, of about 1 to about 3 amps per square inch.

BRIEF DESCRIPTION OF THE DRAWING

The FIGURE is a schematic diagram of one embodiment of the process of the invention.

DESCRIPTION OF THE PREFERRED EMBODIMENTS

In the Figure, showing one embodiment of the process of the invention, scrubbing column 10 receives sour gasoline through line 12. Treated gasoline exits scrubbing column 10 through line 14 and sulfur containing impurities exit scrubbing column 10 through line 16 to anode compartment 32 of electrochemical cell 36 which contains an anode 20, a cathode 22, and a cationic permselective membrane 24. Water soluble sulfates exit from anode compartment 32 through line 18 for disposal to the environment. A pure caustic solution is produced in cathode compartment 34 by feeding deionized water to cathode compartment 34 through line 26. A solution of sodium hydroxide exits cathode compartment 34 through line 30 for recycle to scrubbing column 10.

In addition to the single cell embodiment of the process of the invention shown in the Figure, the oxidation of all the sulfur compounds can be completed in a cascading series of cells hydraulically connected in series or a series of cells hydraulically connected in parallel. In either embodiment, the cell or cells can be operated to produce excess oxygen and the catholyte caustic solution can be used to control the anolyte pH at any desired set point. The excess oxygen produced in the anolyte compartment of the cell or cells can be collected and fed to a pre-oxidation scrubber through which is passed the spent caustic feed solution of sulfur containing impurities. In this way, all the oxygen produced is used in the process rather than discharged to the environment. The elimination of a gaseous discharge from the cell or cells is very desirable since such gaseous discharge will invariably be contaminated with sulfides and mercaptans.

EXAMPLE 1

A refinery spent caustic solution having a pH of 13.4, containing 24,700 mg/l chemical oxygen demand (COD), 4,610 ppm sulfide-sulfur, 1,100 ppm mercaptan-sulfur, 220 ppm sulfate-sulfur, 2.5 wt. % caustic, 33,200 ppm sodium, and normal levels of other refinery inorganic and organic contaminants is electrolyzed in an electrolytic cell so as to obtain an anolyte with greater than 99.9% of the sulfide-sulfur and greater than 99.9% of the mercaptan-sulfur oxidized to sulfate salts. The starting solution is yellowish in color with some traces of oil and has a very strong odor. The final anolyte solution is clear and completely odorless.

Electrolysis is allowed to proceed until almost 100% oxidation of reduced sulfur compounds is achieved. No attempt is made to adjust the anolyte pH. The pH remains above 5.0 for 90% of the electrolysis but quickly drops to pH 0.05 toward the end of the test.

By the time the pH has reached 6.0, greater than 99.9% of the sulfide-sulfur is oxidized to sulfate-sulfur. As the electrolysis proceeds, the anolyte becomes cloudy but quickly clears as the pH drops leaving a sulfide and to mercaptan free solution. Greater than 90% of the available sodium is recovered as a rayon grade 118 grams per liter caustic solution. The volume of the anolyte is reduced by 5–10%. This reduction is obtained by a combination of water loss through oxygen evolution and water movement through the cation-exchange permselective membrane separator of the electrolytic cell. The total sodium recovery obtained by withdrawal of caustic from the catholyte compartment of the electrolytic cell is about 80 to about 95 percent. The electrolysis process is carried out at 55 degrees centigrade. The level of sulfides/mercaptans in the sodium depleted spent caustic is reduced by about 70 to about 99 percent as a result of oxidation of these components at the surface of the anode of the electrolytic cell. The level of phenols and cyanides in the sodium depleted spent caustic solution is also reduced by about 20 to about 50 percent as a result of oxidation of these components during the electrolysis process.

The electrolysis cell utilized is a single bipolar filter-press electrolysis cell having a laminated frame of polyvinyl chloride glued, after sandblasting the areas to be bonded, with an elastomer modified vinyl ester polymer adhesive having an elastomeric monomer grafted onto the backbone of the polymer. The cell frame units are bonded with the same adhesive to form an electrolysis cell having an active area measuring 9.3 inches in height and 4 inches in width. The cell separator used is a commercially available cation-exchange permselective cell membrane. The anode used in the cell is a platinum iridium coating on a titanium mesh substrate. The anode is spot-welded to a titanium substrate current collector on stand-off posts. The cathode used is a 316 stainless steel substrate on stand-off posts connected to a cathode current collector. Bipolar contact between the anode and cathode current collectors is made by utilizing an electrically conductive adhesive which is a mixture of powdered graphite and a vinyl ester polymer having an elastomeric monomer grafted onto the vinyl ester polymer backbone to provide a more ductile and flexible polyester. Graphite powder having a particle size of about 10 microns is present in the proportion of about 40 percent by weight of the mixture. Alternatively, the bipolar electrical contact can be made by spot welding using a vanadium foil intermediate. The electrode to separator gaps for both anode and cathode are 0.040 inches to 0.060 inches. The cell is operated under the following test conditions: 1.07 amps per square inch current density; total cell amperage is 40 amps. Electrolyte circulation in both compartments of the cell is obtained by gas lift only. The cell is operated at a temperature of 55 degrees centigrade to 60 degrees centigrade by providing cooling utilizing a cooling coil in a cathode gas disengager tank. The temperature differential across the membrane separator is about 5 degrees centigrade.

EXAMPLE 2

The electrolysis cell and techniques utilized are similar to those used in Example 1. A refinery spent caustic solution having a pH of 13.4, containing 24,700 mg/l chemical oxygen demand (COD), 4,610 ppm sulfide-sulfur, 1,100 ppm mercaptan-sulfur, 220 ppm sulfate-sulfur, 2.5 wt. % caustic, 33,200 ppm sodium and normal levels of other refinery inorganic and organic contaminants is electrolyzed in an electrolytic cell so as to obtain an anolyte with a neutral to slightly alkaline pH and greater than 99.9% of the sulfide-sulfur and greater than 95% of the mercaptan-sulfur oxidized to sulfate salts. The starting solution is yellowish in color with some traces of oil and has a very strong odor. The final anolyte solution is cloudy and has a slight odor.

The analysis of the final electrolyzed anolyte solution shows a pH of 7.14, 12 ppm sulfide-sulfur, 57 ppm mercaptan-sulfur, 6,700 mg/l COD, 5,205 ppm sulfate-sulfur and 12,300 ppm sodium.

About 63% of the available sodium is recovered on the cathode side of the cell as a rayon grade 125 grams per liter sodium hydroxide solution. The balance of the sodium remains in the anolyte or is recycled to the anolyte compartment of the cell to maintain a neutral to alkaline pH in the anode compartment.

EXAMPLE 3

The electrolysis cell and techniques utilized are similar to those used in Example 1. A synthetic solution prepared with 7,000 mg/l sodium carbonate, 30,000 ppm caustic, 4,760 ppm phenol and 500 ppm methyl mercaptan is electrolyzed in an electrolytic cell so as to oxidize phenol and obtain an anolyte with a pH of about 12. The starting solution is colorless and has a very strong odor. The final anolyte solution is a very dark brown color and has an organic odor.

The analysis of the final electrolyzed anolyte solution shows 3,640 ppm phenol. The synthetic solution feed rate is 23.445 ml/min and the overflow rate is 21.68 ml/min.

About 30% of the available phenol is oxidized and sodium is recovered on the cathode side of the cell as a rayon grade 120 grams per liter sodium hydroxide solution.

EXAMPLE 4

The electrolysis cell and the techniques are similar to those in example one, only multiple cells are used. Three cells are connected hydraulically in parallel such that all cells are operated at the same concentrations and conditions. The anode compartment of the cell is fed with a simulated refinery caustic waste solution containing 37,600 mg/l sulfide sulfur, 2,270 sulfate sulfur, 50 ppm thiosulfate sulfur, 1,200 ppm mercaptan sulfur, 66,000 ppm NaOH and 1,000 ppm phenols. The feed rate is maintained such that the feed solution is almost 100% oxidized and sufficient excess oxygen is evolved from the anode to maintain circulation through the anode compartment of the cell without pumping.

The excess oxygen from the anode compartment of the cell is fed to the bottom of a packed column. Feed solution to the cell is fed to the top of the column. Most of the excess oxygen reacted with the feed solution in the column creating a per-oxidation step before electrolysis. Additionally, gaseous discharges from the anode compartment of the cell are essentially eliminated with this arrangement. This also ensures close to 100% oxidation efficiency as measured by the amount of oxidation carried out relative to the amount of current applied to the cell.

The cathode reaction is the evolution of hydrogen gas and the production of hydroxyl ion through the electrolysis of water. The cathode compartment of the cell is fed with deionized water at a rate sufficient to match the rate of sodium ion transport from the anode compartment through the membrane separator such that a sodium hydroxide concentration of about 200 gpl is maintained in the solution exiting the cathode compartment and sufficient water is always present to allow the hydrogen evolution reaction on the cathode to proceed.

The pH in the anode compartment is controlled at 7.0–8.0 by adding a portion of the sodium hydroxide solution produced in the cathode compartment. The treated refinery waste solution exiting the anode side of the cell is essentially a neutral pH sodium sulfate solution.

EXAMPLE 5

The above Example 4 is repeated except that the three cells are connected hydraulically in series such that the anolyte overflows from the first cell to the anolyte compartment of the second cell and which in turn overflows to the anolyte compartment of the third cell. Similarly, the catholyte overflows from the first cell to the catholyte compartment of the second cell, etc. In this way, the pH is decreased from very alkaline in the anode compartment of the first cell to neutral in the anode compartment of the last cell and from slightly alkaline in the cathode compartment of the first cell to very alkaline in the cathode compartment of the last cell. Feed rates are controlled to maintain the same end cell conditions as in the above example. The pH in the end cell is controlled at 7.0–8.0 by adding a portion of the sodium hydroxide solution produced in the cathode compartment. Excess oxygen from the sodium hydroxide solution produced in the cathode compartment. Excess oxygen from the end cell is fed to a packed column and scrubbed with feed solution as in the above example. Oxidation performance and efficiency similar to Example 4 is achieved.

Excess oxygen is not produced in the anode compartment of the first two cells in the series and sufficient circulation could only be achieved in these cells by pumping. However, the voltages and, therefore, the energy consumption in the first two cells is reduced over those in the above example because the higher alkalinity solutions have a higher conductivity than the neutral pH solutions.

While this invention has been described with reference to certain specific embodiments, it should be recognized by those skilled in the art that many variations are possible without departing from the spirit and scope of the invention and it will be understood that it is intended to cover all changes and modifications of the invention disclosed herein for the purpose of illustration which do not constitute departures from the spirit and scope of the invention.

What is claimed is:

1. An electrochemical process for treatment of an aqueous mixture comprising oxidizable, sulfur-containing impurities, said mixture obtained by scrubbing a hydrocarbon gas or liquid with an aqueous alkali metal hydroxide solution whereby said aqueous mixture is electrochemically reacted, without recovery of disulfides to convert said aqueous mixture to a first, aqueous solution substantially comprising a water soluble sulfate in which any sulfide-sulfur, mercaptan-sulfur, and phenols are oxidized and to convert said aqueous mixture to a second, essentially sulfur-free, aqueous solution of an alkali metal hydroxide, said process comprising:

(A) electrolyzing said aqueous mixture at a temperature of about 20° C. to about 100° C. and a current density of about one to about three amps per square inch in an anode compartment of each unit of multiple units of a two-compartment electrolysis cell comprising a cationic permselective membrane cell separator, a dimensionally stable anode and an anolyte in an anode compartment, and a cathode and a catholyte in a cathode compartment, (B) feeding water as catholyte to said cathode compartment, and thereafter (C) withdrawing from said anode compartment said first solution and withdrawing from said cathode compartment said second solution.

2. A process for electrolytically producing, without recovery of disulfides, a first, aqueous solution substantially comprising a water soluble sulfate and an essentially sulfur-free, alkali metal hydroxide, second, aqueous solution from an aqueous mixture obtained by scrubbing a hydrocarbon gas or liquid with an aqueous alkali metal hydroxide, said process comprising:

(A) electrolyzing said aqueous mixture at a temperature of about 20° C. to about 100° C. and a current density of about one to about three amps per square inch in multiple units of a two-compartment electrolysis cell comprising a cationic permselective membrane cell separator, a dimensionally stable anode and an anolyte in an anode compartment and a cathode and a catholyte in a cathode compartment, while feeding water as catholyte to said cathode compartment and controlling the pH of said anolyte by passing a selected amount of said catholyte to said anode compartment and thereafter, (B) withdrawing from said anode compartment said first, aqueous solution, substantially comprising a water soluble sulfate, in which any sulfide-sulfur, mercaptan-sulfur, and phenols are oxidized, and withdrawing from said cathode compartment said essentially sulfur-free, alkali metal hydroxide, second, aqueous solution.

3. The process of claim 1 wherein said process is conducted in a cascading series of bipolar electrolysis cells, said sulfate solution is an alkali metal sulfate solution, said aqueous mixture is obtained by scrubbing a hydrocarbon liquid, and the pH is controlled by passing a selected amount of said catholyte to said anolyte compartment.

4. The process of claim 3 wherein said cells are hydraulically connected in series or parallel and said alkali metal is sodium.

5. The process of claim 4 wherein said cells are hydraulically connected in series.

6. The process of claim 5 wherein said cationic permselective cell separator comprises a sulfonate or carboxylate group-containing, organic polymer.

7. The process of claim 6 wherein said cationic permselective cell separator is a perfluorinated cationic exchange membrane.

8. The process of claim 7 wherein said electrolysis cell is a filter press electrolyzer comprising a planar dimensionally stable anode and a planar anode current collector, a planar cathode and a planar cathode current collector, and laminated polymer cell frames wherein said anode and cathode current collectors are of the same metal or, if of dissimilar weldable metals, are electrically connected by welding or are electrically connected by welding to an intermediate metal layer, or are electrically connected by bonding with an electrically conductive polymer mixture.

9. The process of claim 2 wherein said electrolysis cell is a bipolar, filter press electrolyzer and said alkali metal hydroxide is sodium hydroxide.

10. The process of claim 9 wherein said process is conducted in a cascading series of cells hydraulically connected in series.

* * * * *